United States Patent
Gale et al.

(10) Patent No.: US 6,580,178 B1
(45) Date of Patent: Jun. 17, 2003

(54) PULSED CHARGE STARTER/ALTERNATOR CONTROL SYSTEM

(75) Inventors: Allan Roy Gale, Livonia; Michael W Degner, Farmington Hills, both of MI (US); Michael Alan Tamor, Toledo, OH (US)

(73) Assignee: Ford Global Technologies, Inc., Dearborn, MI (US)

( * ) Notice: Subject to any disclaimer, the term of this patent is extended or adjusted under 35 U.S.C. 154(b) by 396 days.

(21) Appl. No.: 09/667,196

(22) Filed: Sep. 21, 2000

(51) Int. Cl.$^7$ ................................. H02P 9/04
(52) U.S. Cl. .................. 290/32; 290/38 R; 180/65.3; 123/339.14
(58) Field of Search ................... 290/31, 32, 36 R, 290/38 R, 40 R, 40 C; 477/46; 180/165, 65.3, 65.6; 123/339.14, 339.16

(56) References Cited

U.S. PATENT DOCUMENTS

| | | | |
|---|---|---|---|
| 4,313,080 A | * 1/1982 | Park | 180/65.2 |
| 4,720,638 A | 1/1988 | Vollbrecht | 290/38 R |
| 4,916,345 A | 4/1990 | Tong | 310/208 |
| 5,001,412 A | 3/1991 | Carter et al. | 322/10 |
| 5,097,140 A | 3/1992 | Crall | 290/36 R |
| 5,146,095 A | 9/1992 | Tsuchiya et al. | 290/38 R |
| 5,155,374 A | 10/1992 | Shirata et al. | 290/38 R |
| 5,157,267 A | 10/1992 | Shirata et al. | 290/38 R |
| 5,285,862 A | 2/1994 | Furutani et al. | 180/65.4 |
| 5,336,932 A | * 8/1994 | Barske | 290/1 R |
| 5,350,994 A | 9/1994 | Kinoshita et al. | 320/15 |
| 5,469,820 A | 11/1995 | Data et al. | 123/192.2 |
| 5,651,341 A | * 7/1997 | Harada et al. | 123/339.2 |
| 5,705,859 A | 1/1998 | Karg et al. | 290/45 |
| 5,786,640 A | * 7/1998 | Sakai et al. | 180/65.2 |
| 5,925,938 A | 7/1999 | Tamor | 290/31 |
| 5,935,040 A | * 8/1999 | Tabata et al. | 180/65.2 |
| 5,998,976 A | 12/1999 | Steffan | 322/10 |
| 6,049,185 A | 4/2000 | Ikeda | 318/442 |
| 6,116,368 A | * 9/2000 | Lyons et al. | 180/165 |
| 6,177,734 B1 | * 1/2001 | Masberg et al. | 290/31 |
| 6,274,942 B1 | * 8/2001 | Pels | 290/40 B |
| 6,278,915 B1 | * 8/2001 | Deguchi et al. | 180/65.2 |
| 6,328,671 B1 | * 12/2001 | Nakajima et al. | 180/65.4 |

* cited by examiner

Primary Examiner—Nicholas Ponomarenko
(74) Attorney, Agent, or Firm—Jerome R. Drouillard

(57) ABSTRACT

A system and method of charging an energy storage device in a vehicle including an engine coupled to a combined starter/alternator and an energy storage device connected to said starter/alternator. The energy storage device provides electrical power to the vehicle. The method comprises the steps of determining a peak efficiency torque value of the starter/alternator when operating as an electrical generator, and intermittently operating the starter/alternator for a predetermined period of time as an electrical generator at approximately the peak efficiency torque value. In this way, the output of the starter/generator is substantially greater than an average power load value of the vehicle for a predetermined period of time, but the average power output of the starter/generator is approximately equal to the average power load requirements of the vehicle. In one aspect of the invention, the engine output torque is increased by the peak efficiency torque value associated with the starter/alternator, and a switching circuit is periodically activated to maintain the desired charge on the energy storage device.

18 Claims, 1 Drawing Sheet

PULSED CHARGE STARTER/ALTERNATOR CONTROL SYSTEM

CROSS REFERENCE TO RELATED APPLICATIONS

This application is related to co-pending U.S. patent application Ser. No. 09/666,582 entitled "Power Delivery Circuit With Boost For Energetic Starting In A Pulsed Charge Starter/Alternator System" filed Sep. 21, 2000 and U.S. patent application Ser. No. 09/667,087 entitled "Pulsed Charge Power Delivery Circuit" filed Sep. 21, 2000 both of which are incorporated herein by reference and commonly owned by the assignee of the present invention.

BACKGROUND OF THE INVENTION

The present invention relates to electrical systems for motor vehicles and more particularly, to a pulsed charge control system for a vehicle electrical system having a combined starter/alternator.

Combined starter/alternators such as those known in the art are disclosed in U.S. Pat. Nos. 4,720,638; 4,916,345; 5,001,412; 5,097,140 and 5,469,820. A combined starter/alternator as used in a motor vehicle can be used as a motor to crank and start the engine as well as a generator to provide electrical power to the vehicle electrical systems.

When operated as a starter motor, the starter/alternator is supplied with current from the battery and outputs a high torque to crank the engine until the engine is started. When used as a generator, the running engine is coupled to the starter/alternator which, in turn, produces a three-phase output that is rectified to a steady state DC output that is used to maintain the charge on the vehicle energy storage device to meet the vehicle electrical load requirements.

When operating as a generator, the efficiency of the starter/alternator is defined as the ratio of the input power to the output power. Such generators have both fixed and variable losses. Some of these losses are associated with the switching circuitry such as the inverter used to rectify the output of the generator. There are three primary classifications of losses: mechanical losses, electrical losses, and magnetic losses. Mechanical losses are primarily due to the rotation of the rotor and include bearing friction loss and windage loss. Magnetic losses include eddy current-current loss and hysteresis loss. All of these losses can be grouped into two categories, namely, fixed losses and variable losses. Fixed losses are losses that do not change with load when the machine is operating at a known speed. Therefore, rotational losses are one part of fixed losses. In the case of a wound machine where the field current is required to set up the required flux in the machine, the power supplied to the field lining is also considered a fixed loss. On the other hand, variable losses are losses that vary with the load current. All of the copper losses are included in this category. Since the losses associated with the starter/alternator when operating as a generator are only partially load dependent, the system exhibits low efficiencies at low power levels. At higher output power levels, the output power rises relative to the losses and correspondingly, the system efficiency rises as well. This continues up to a peak efficiency torque point wherefore additional torque input into the generator does not result in a significant increase in power output and, hence, the efficiency falls off.

It has been found that operating a starter/alternator at a continuous power output approximately equal to the vehicle electrical load demand such as 500W is a low efficiency output for a typical starter/alternator. Accordingly, there is a need for a starter/alternator control system having increased efficiency.

SUMMARY OF THE INVENTION

Accordingly, it is an object of the invention to provide a starter/alternator control system for a motor vehicle having a high efficiency. According to the present invention, the foregoing and other objects are attained by a system and method of charging an energy storage device in a vehicle including an engine coupled to a combined starter/alternator and an energy storage device connected to said starter/alternator. The energy storage device provides electrical power to the vehicle. The method comprises the steps of determining a peak efficiency torque value of the starter/alternator when operating as an electrical generator, and intermittently operating the starter/alternator for a predetermined period of time as an electrical generator at approximately the peak efficiency torque value. In this way, the output of the starter/generator is substantially greater than an average power load value of the vehicle for a predetermined period of time, but the average power output of the starter/generator is approximately equal to the average power load requirements of the vehicle. In one aspect of the invention, the engine output torque is increased by the peak efficiency torque value associated with the starter/alternator, and a switching circuit is periodically activated to maintain the desired charge on the energy storage device.

An advantage of the present invention is that it has an increased system efficiency as compared to conventional starter/alternator control systems. Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should be made to the embodiments illustrated in greater detail in the accompanying drawings and described below by way of examples of the invention.

In the drawings.

DETAILED DESCRIPTION OF THE INVENTION

Figure 1:
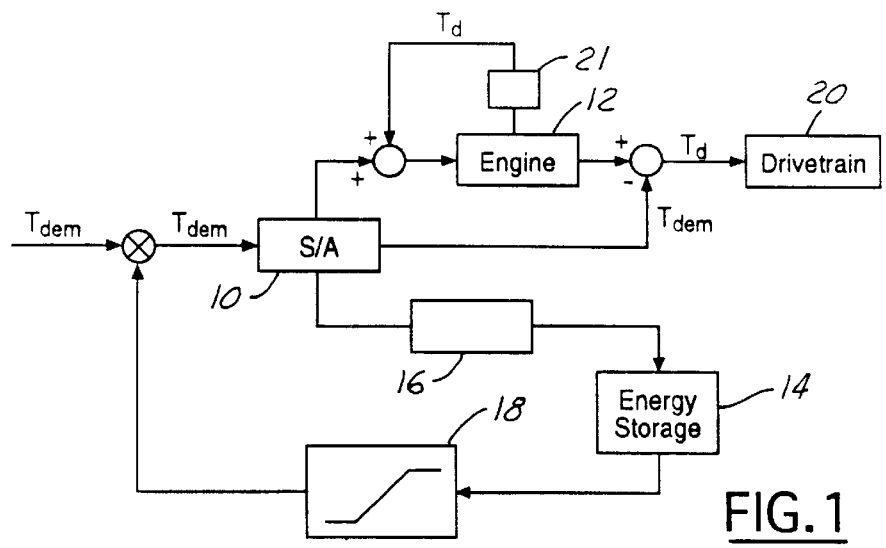
FIG. 1 is a control diagram of a pulsed charge starter/alternator control system for a vehicle according to one embodiment of the present invention.

FIG. 1 is a control diagram of a pulsed charge starter/alternator control system for a vehicle in accordance with one embodiment of the present invention. As shown in FIG. 1, the combined starter/alternator 10 is coupled to the engine 12 and the vehicle energy storage device 14. Switching circuitry 16 rectifies the output of the starter/alternator 10 to provide a DC output to the energy storage device 14 to maintain the desired on the energy storage device 14. The starter/alternator 10 is preferably a single component such as any known combined starter/alternator. Likewise, the engine 12 is a conventional internal combustion engine. The energy storage device 14 is preferably a battery, but may additional or alternatively be a capacitor or other energy storage device. Switching circuitry 16 includes a controller such as a digital signal processor and inverter comprising power switching devices such as MOSFETs or IGBTs and associated diodes. In this way, starter/alternator output is converted to direct current through the external diodes, typically referred to as fly back diodes, which are connected in reverse polarity and in parallel with each of the power switches in the circuit.

The pulsed charge control system also includes a controller 18 which can be a digital signal processor or conventional microcomputer comprising an input/output bus, central processing unit and associated memory such as random access memory and read-only memory. The controller 18, as described below with reference to FIGS. 2 and 3, contains the logic which operates the switching circuitry 16 and starter/alternator 10 to selectively provide power to the energy storage device 14.

In operation, to start the engine 12, the energy storage device 14 supplies current to the starter/alternator 10 which, when acting as a starter, produces a torque to rotate the crankshaft of the engine 12 until the engine is fired and running on its own. Once the engine 12 is running, it is used to power the drivetrain 20, among other things, by outputting a desired torque ($T_d$) as dictated by the driver demand and engine controller 21.

As discussed above, the starter/alternator, when operating as a generator, has an associated peak efficiency corresponding to a peak efficiency input torque ($T_{dem}$). In other words, when the starter/alternator is operated at the peak efficiency operating torque $T_{dem}$, it has an associated power output that corresponds to a peak efficiency value for the starter/alternator. The power output corresponding to the peak efficiency operating point of a combined starter/alternator in a typical vehicle system will be in the range of approximately 2 kW to 4 kW which is a function of engine speed. A typical vehicle electrical load demand, however, is on the order of 0.5 kW. Accordingly, operating the starter/alternator 10 to produce a continuous low power output of approximately 0.5 kW would require operating the starter/alternator 10 at a point other than its peak efficiency operating range.

The peak efficiency operating range for the starter/alternator 10 can be determined by either performing actual load tests on the particular starter/alternator under consideration, or by calculating its performance at different load levels, or by any other known method.

As shown in FIG. 1, to operate the starter/alternator 10 at its peak efficiency, the peak efficiency torque input $T_{dem}$ must be developed by the engine 12 in addition to the normal desired torque $T_d$ corresponding to the driver demand as governed by the engine controller 21.

Figure 2:
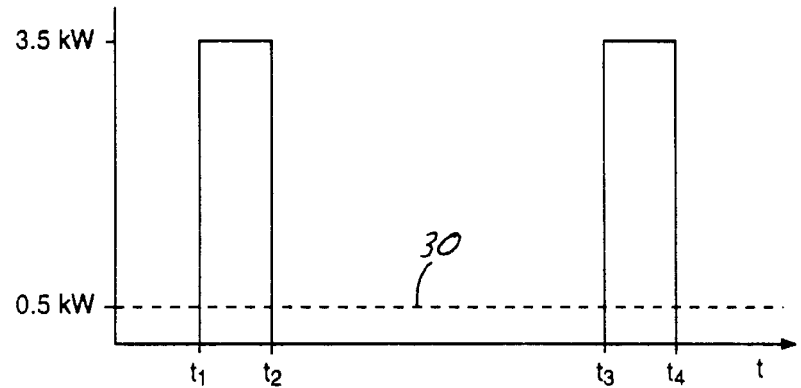
FIG. 2 is a graph representing one method of operation of the pulsed charge control system according to the present invention.

Referring now to FIG. 2, there is shown a graph of one method of operating the pulsed charge control system of FIG. 1. In the example shown in FIG. 2, the line 30 represents a 0.5 kW load for the starter/alternator under consideration, it was determined that the peak efficiency torque ($T_{dem}$) corresponded to 20 Nm. When operating as a generator at the value of $T_{dem}$ over a typical drive cycle operating speed of 1500 to 2500 RPM, the starter/alternator produces an output power of 3.5 kW. Because the 3.5 kW output of the starter/alternator operating at its peak efficiency is much greater than the vehicle electrical load demand of 0.5 kW, the control system of the present invention pulse charges the energy storage device 14 such that the average power output is at least as great as the vehicle electrical load demand to prevent draining the energy storage device 14 below this critical point. In the example shown in FIG. 2, and with reference to FIG. 1, a controller 18 activates the switching circuitry 16 at time t, to electrically couple the energy storage device 14 to the starter/alternator 10 operating at its peak efficiency torque $T_{dem}$. At time $t_2$, the starter/alternator is disabled and/or the inverter drive switches are not switched. From time $t_2$ to $t_3$, the energy storage device 14 supplies the power to meet the 0.5 kW load demand. At $t_3$, the starter/alternator is electrically coupled to the energy storage device 14 by the switching circuitry 16 and controller 18 to charge the energy storage device 14. This cycle then continues as necessary.

The minimum charging pulse width is selected by measuring the starter/alternator rotor time constant which is defined as the time required to reach 63% of the final field producing current. If sufficient power from the energy storage device 14 is available, the required field current can be achieved faster, and a narrower pulse can be considered. Of course, these parameters will depend upon the characteristics of the particular starter/alternator being considered, the capacity and type of the energy storage device 14, and the vehicle electrical load demand. Preferably, the charging pulsewidth is selected to ensure that the starter/alternator is spending only a small portion of its time building up its field relative to the time it can spend charging the energy storage device. For the example shown at FIG. 2, the time from $t_1$ to $t_2$ is approximately 10 seconds in the time from $t_2$ to $t_3$ is approximately 60 seconds. It was found in this example, that operating the starter/alternator at a continuous output of approximately 0.5 kW, the resulting efficiency was approximately 55%. The same system operated in the pulse power producing mode with 3.5 kW pulses of 10 second duration had a system efficiency of approximately 84%. Accordingly, the pulsed charge control system of the present invention represented a 52% improvement in system efficiency as compared to a conventional continuous low power charge system.

The period between pulses ($t_2$ to $t_3$) can be either variable or constant. In a constant period system, the period is set to ensure that the discharge of the energy storage device 14 does not fall below the maximum potential vehicle electrical load demand. In a variable periods control scheme, the energy storage device 14 can be monitored and, upon reaching a minimum voltage value, can be pulse charged to a desired maximum voltage value. In this way, when the vehicle electrical load demand is low, the period between pulsed charging events can be greater than the period between pulsed charging events when the vehicle electrical load demand is high. In a similar manner, the duration of the pulsed charge ($t_1$ to $t_2$) can be variable or constant. As well, the magnitude of the pulsed charge can be variable. It may be necessary during times of peak engine load (maximum $T_d$) to reduce the torque available from the engine to operate the starter/alternator. At such times, the starter/alternator may be operated at a torque less than $T_{dem}$ and the resulting pulsewidth may also increase to allow the lower power output of the starter/alternator to charge the energy storage device to the desired level.

Figure 3:
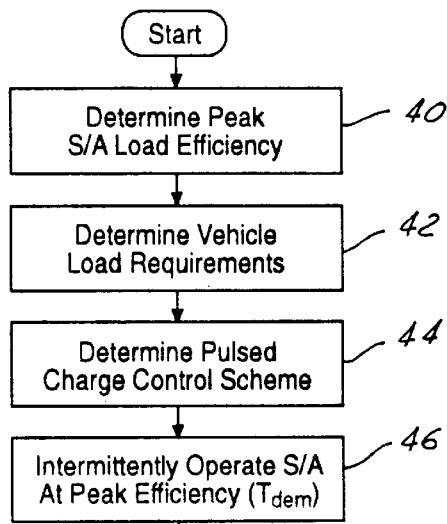
FIG. 3 is a logic flow diagram of one method of implementing the pulsed charge control system according to the present invention.

Referring now to FIG. 3, there is shown one method of implementing the pulsed charge control system according to the present invention. In step 40, the peak starter/alternator load efficiency is determined. This is accomplished by known methods including measuring or calculating the starter/alternator efficiency at various speed and load operating points. The vehicle electrical load requirements are determined in step 42. This may be, for example, 0.5 kW. In step 44, the pulsed charge control scheme is determined.

This step determines the duration magnitude and frequency of the charging pulses by taking into account the characteristics of the energy storage device, the characteristics of the starter/alternator including its power output at peak efficiency, and the vehicle electrical load characteristics. In step 46, the controller is then programmed to intermittently operate the starter/alternator according to the pulsed charge control scheme as developed in step 44. This includes controlling the switching circuitry 16 to electrically couple the starter/alternator while operating as a generator at peak efficiency to the energy storage device to maintain the desired level of charge on the energy storage device. As mentioned above, the peak efficiency $T_{dem}$ is preferably the input torque corresponding to the highest efficiency operation of the starter/alternator. The peak efficiency, however, also includes torque values less than that $T_{dem}$ when, for reasons related to engine performance or output, the torque corresponding to $T_{dem}$ is unavailable from the engine.

From the foregoing, it can be seen that there has been brought to the art a new and improved pulsed charge starter/alternator control scheme which has advantages over conventional starter/alternator control schemes. While the invention has been described in connection with one or more embodiments, it should be understood that the invention is not limited to those embodiments. On the contrary, the invention covers all alternatives, modifications and equivalents as may be included within the spirit and scope of the appended claims.

What is claimed is:

1. In a vehicle including an engine coupled to a combined starter/alternator, and an energy storage device connected to said starter/alternator, said energy storage device providing electrical power to said vehicle, a method of charging said energy storage device comprising the steps of:

determining a peak efficiency torque value of said starter/alternator when operating as an electrical generator; and intermittently operating said starter/alternator for a predetermined period of time as an electrical generator at approximately said peak efficiency torque value such that the output of said starter/generator is substantially greater than an average power load value of said vehicle.

2. The method of claim 1 wherein the step of intermittently operating said starter/alternator includes the steps of monitoring a charge value of said energy storage device, and operating said starter/alternator as an electrical generator when said charge value is less than a desired charge value.

3. The method of claim 1 wherein the period of said intermittent operation of said starter/alternator is constant.

4. The method of claim 1 wherein the period of said intermittent operation of said starter/alternator is variable.

5. The method of claim 1 wherein the predetermine period of time is such that the average power generated by said starter/generator between periods of said intermittent operation is approximately equal to said average power load of said vehicle.

6. The method of claim 1 wherein the step of determining a peak efficiency torque value of said starter/alternator includes the step of measuring the efficiency of said starter/alternator at a plurality of operating speeds and loads.

7. The method of claim 1 further comprising the step of increasing the output torque of said engine by an amount approximately equal to said peak efficiency torque value.

8. The method of claim 7 wherein the step of intermittently operating said starter/alternator includes the step of activating a switching circuit for said predetermined period of time to electrically couple said starter/alternator and said energy storage device.

9. The method of claim 1 wherein the step of intermittently operating said starter/alternator includes the step of intermittently increasing the output torque of said engine by an amount approximately equal to said peak efficiency torque value.

10. The method of claim 1 wherein the period of said intermittent operation of said starter/alternator is a function of a rotor time constant of said starter/alternator.

11. An electrical system for a vehicle including an engine, the system comprising:

a combined starter/alternator coupled to said engine for receiving motive power and cranking said engine, and generating electrical power when coupled to a running engine;

an energy storage device electrically coupled to said starter/alternator by a switching circuit, said energy storage device for providing electrical power to vehicle systems;

a controller in operative communication with said starter/alternator and said energy storage device, said controller programmed to perform the following steps:

intermittently operate said starter/alternator as an electrical generator at approximately a peak efficiency torque value such that the output of said starter/generator is substantially greater than an average power load value of said vehicle for a predetermined period of time.

12. The electrical system of claim 11 wherein said controller is further programmed to monitor a charge value of said energy storage device and operate said starter/alternator as an electrical generator when said charge value is less than a desired charge value.

13. The electrical system of claim 11 wherein said energy storage device is a capacitor.

14. The electrical system of claim 11 wherein said energy storage device is a battery.

15. The electrical system of claim 11 wherein said energy storage device includes a battery and a capacitor.

16. The electrical system of claim 11 wherein said controller is further programmed to activate said switching circuit for said predetermined period of time to electrically couple said starter/alternator and said energy storage device.

17. In a vehicle including an engine coupled to a combined starter/alternator, and an energy storage device electrically coupled to said starter/alternator by a switching circuit, said energy storage device providing electrical power to said vehicle, a method of charging said energy storage device comprising the steps of:

increasing an engine output torque by a peak efficiency torque value associated with said starter/alternator such that said starter/alternator operates as a generator at approximately its peak efficiency; and activating said switching circuit for a predetermined period of time to couple said starter/alternator and said energy storage device, the output of said starter/generator being substantially greater than an average power load value of said vehicle.

18. The method of claim 17 wherein the step of activating includes the step of monitoring a charge value of said energy storage device, and activating said switching circuit for a predetermined period of time when said charge value is less than a desired charge value.

* * * * *